United States Patent
Parsche et al.

(10) Patent No.: US 8,115,333 B2
(45) Date of Patent: Feb. 14, 2012

(54) WIND TURBINE PROVIDING REDUCED RADIO FREQUENCY INTERACTION AND RELATED METHODS

(75) Inventors: Francis Eugene Parsche, Palm Bay, FL (US); John Steven Seybold, Malabar, FL (US)

(73) Assignee: Harris Corporation, Melbourne, FL (US)

( * ) Notice: Subject to any disclaimer, the term of this patent is extended or adjusted under 35 U.S.C. 154(b) by 0 days.

(21) Appl. No.: 12/821,623

(22) Filed: Jun. 23, 2010

(65) Prior Publication Data

US 2011/0316285 A1    Dec. 29, 2011

(51) Int. Cl.
*F03D 7/04* (2006.01)
(52) U.S. Cl. ............... 290/55; 290/44; 415/4.3
(58) Field of Classification Search ........ 290/43, 290/44, 54, 55; 415/4.3, 41
See application file for complete search history.

(56) References Cited

U.S. PATENT DOCUMENTS

| | | | |
|---|---|---|---|
| 4,323,331 A | 4/1982 | Schachle et al. | 416/9 |
| 4,651,017 A * | 3/1987 | Longrigg | 290/44 |
| 6,224,341 B1 | 5/2001 | Fricke | 416/248 |
| 6,320,272 B1 * | 11/2001 | Lading et al. | 290/44 |
| 6,790,007 B2 | 9/2004 | Gingras et al. | 416/183 |
| 6,909,198 B2 * | 6/2005 | Ragwitz et al. | 290/44 |
| 6,946,751 B2 * | 9/2005 | Yoshida et al. | 290/44 |
| 7,023,105 B2 * | 4/2006 | Wobben | 290/44 |
| 7,281,891 B2 * | 10/2007 | Smith et al. | 415/4.3 |
| 7,342,323 B2 * | 3/2008 | Avagliano et al. | 290/55 |
| 7,522,976 B2 * | 4/2009 | Stommel | 700/287 |
| 2004/0253114 A1 | 12/2004 | Gunneskov et al. | 416/224 |
| 2006/0169930 A1 | 8/2006 | Butler | 250/505.1 |
| 2007/0013194 A1 | 1/2007 | Calley | 290/44 |
| 2009/0121491 A1 | 5/2009 | Mikkelsen | 290/55 |
| 2009/0202347 A1 | 8/2009 | Rugger | 416/31 |

OTHER PUBLICATIONS

Emerson, Electromagnetic Wave Absorbers and Anechoic Chambers Through the Years, Emerson & Cuming, Inc., Canton, MA, pp. 484-490, Oct. 9, 1972.
Sagrillo et al., Wind Turbine Buyer's Guide, www.homepower.com, pp. 34-40, Jun. & Jul. 2007.
3M™ Glass Bubbles Product Catalog for 3M™ Energy and Advanced Materials, pp. 1-3, 2010.
3M™ Glass Bubbles HGS Series Product Information, Apr. 2009.
Brenner et al., Wind Farms and Radar, The MITRE Corporation, Jan. 2008.
Barras, Stealthy Wind Turbines Aim to Disappear from Radar Screens, www.newscientist.com, pp. 1-5, Oct. 23, 2009.
3M™ Microspheres, Innovative Solutions for Demanding Applications, Product Information, pp. 1-6, Jul. 2004.
Carbonyl Iron Powder, BASF, pp. 1-8, Sep. 2009.
Radar Absorbers, Microwave Encyclopedia, www.microwaves101.com, pp. 1-11, May 3, 2009.

* cited by examiner

*Primary Examiner* — Nicholas Ponomarenko
(74) *Attorney, Agent, or Firm* — Allen, Dyer, Doppelt, Milbrath & Gilchrist, P.A.

(57) ABSTRACT

A wind turbine electrical generator may include a monopole tower extending upwardly from ground level. The wind turbine electrical generator may also include an electrical power generator carried by an upper end of the monopole tower and may include a horizontally extending drive shaft. The wind turbine electrical generator may further include a plurality of wind-driven blades carried by the horizontally extending drive shaft. The monopole tower may have an outer surface with a vertically extending outer corner therein defining a pair of adjacent vertical facets. The monopole tower may be positioned with the vertically extending outer corner aligned with the land-based radar site so that the pair of adjacent vertical facets reflects radar illumination away from the radar site to reduce an amount of the radar illumination reflected back to the land-based radar site.

46 Claims, 13 Drawing Sheets

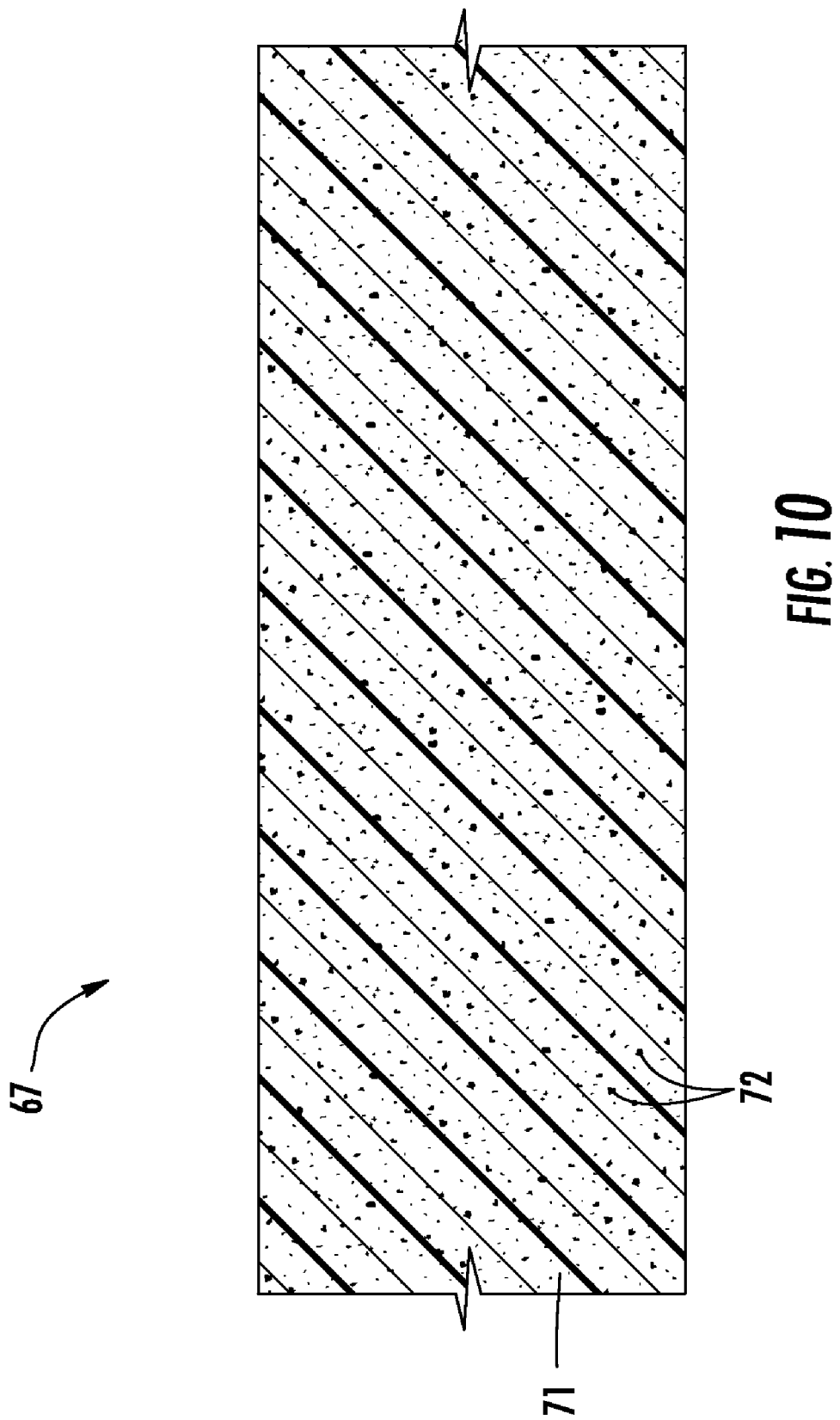

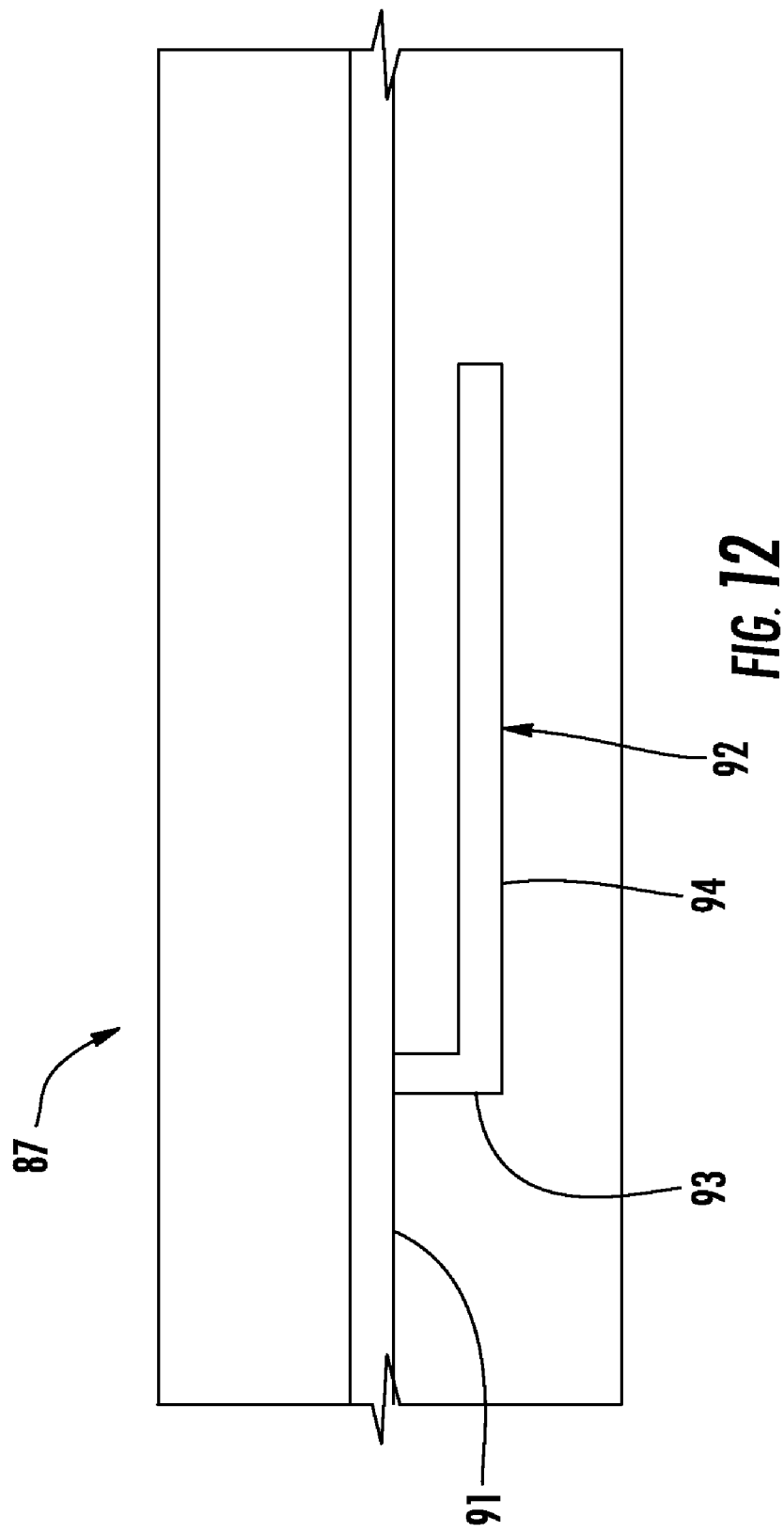

WIND TURBINE PROVIDING REDUCED RADIO FREQUENCY INTERACTION AND RELATED METHODS

FIELD OF THE INVENTION

The present invention relates to the field of wind turbines, and, more particularly, to a wind turbine electrical generator and related methods.

BACKGROUND OF THE INVENTION

Electric generation from wind is becoming an increasingly popular alternative to electric generation from other sources, for example, fossil fuels. More particularly, electrical power generated from the wind is expected to grow. A wind turbine assembly may be used to convert the wind to electrical power.

A typical wind turbine assembly, for example, the 2XL Wind Turbine, available from General Electric, Inc. of Fairfield, Conn., includes a support structure or pylon that extends skyward from the ground. A typical support structure may extend about five-hundred feet into the air from the ground. A housing including an electrical generator may be carried by an end of the support structure. A plurality of fan blades, for example, three, may extend outwardly from a shaft of the electrical generator. In operation, the force from incident wind currents causes the fan blades to rotate the generator shaft to cause electrical power to be generated. In some instances, up to 2.5 Megawatts may be generated.

Wind turbines may be available in a variety of configurations. For example, U.S. Pat. No. 6,790,007 to Gingras et al. discloses a vertical axis wind turbine including a rectangular shaped turbine extending from a pyramidal base. U.S. Patent Application Publication No. 2007/0013194 to Calley discloses a wind turbine attached to a monopole tower. U.S. Pat. No. 4,323,331 to Schachel et al. discloses a rotating tower that includes a plurality of structural beams. Other tower arrangements may include tubular towers, guyed towers, and lattice towers.

Geographic placement of a wind turbine may be problematic in areas near an airport or other radar site, for example. This is because a typical wind turbine assembly is not designed or constructed to address radar backscatter. More particularly, the support structure and electric generator housing may produce a static radar return, and the fan blades may produce a Doppler radar return. For example, a tip of a fan blade may reach a velocity of about 200 miles per hour, and thus, may cause an air traffic control radar to generate a "false alarm." Additionally, the velocities of the fan blade toward and away from a weather radar, for example, may mimic a radar signature of a tornado vortex. The broad range of static and Doppler returns from a wind turbine or wind farm may reduce sensitivity to low and moderate altitude aircraft over a given azimuth sector.

Indeed, a wind turbine assembly may cause both reflectivity and motion interference that may impact any radar site that covers the region where it is located. A grouping of wind turbine assemblies, known as a wind farm, may further compound the interference. To reduce interaction with a radar installation it may be desirable to locate a wind farm beyond the radio line of site (due to the potential for refraction.) An estimate of the radar line of site may be made based upon the line of sight equation, described by Howard W. Sams in the ITT Reference Data for Radio Engineers, sixth ed., 1976, pages 12-28. By considering the distance to the radio horizon for the turbine and/or wind farm and that for the radar, an estimate of the line of site can be obtained.

According to the equation:

$$d=(3\ Kh/2)^{1/2}=(3(1.33)(492/2))^{1/2}=31.3\ \text{miles}$$

where h is the height of the antenna in feet, and K is the index of tropospheric refraction (usually taken to be 4/3 at sea level), the radio or radar horizon of the wind turbine will be approximately 31 miles. Using the same equation for a radar with a nominal height of 50 feet above the surface yields 6 miles. Thus over a smooth earth, 37 miles of separation may be desired to reduce a line of site interaction. Allowing an additional margin for signal refraction over the horizon, separations of 50 to 100 miles may be desired. This degree of separation may be relatively difficult to achieve, particularly in coastal areas. There may be the additional problem that oftentimes, wind farms are located on tall ridge lines to provide more efficient wind harvesting. In such cases they may be visible to a radar system hundreds of miles away. For these reasons, mitigation of the interaction between wind farms and radars by controlling the spatial separation of the two may not practical. Relying on geographical distance to control interaction may preclude at least a hundred of square miles of real estate from consideration for wind harvesting. By unnecessarily eliminating large tracts of land from consideration, many landowners will be excluded from participation in wind energy generation. Additionally, directional broadcast stations such as those in the range of 530 to 1710 kHz may employ directional antenna arrays whose radiation pattern nulls may be altered or degraded by proximity to nearby wind turbine structures.

U.S. Patent Application Publication No. 2009/0202347 to Rugger discloses a control system for mitigating effects of a wind turbine on a radar system. The control system includes a sensor configured to detect an operating condition of the radar system. The control system also includes a processor configured to receive an operating condition of the wind turbine and determine a rotation modification sequence based on the operating condition of the radar system and the operating condition of the wind turbine. The control system further includes a controller configured to apply the rotation modification sequence to the wind turbine. In other words, the control system manipulates the wind turbine to mitigate the effects on the radar system.

U.S. Patent Application Publication No. 2009/0121491 to Mikkelsen discloses a wind turbine that includes a conductive film layer on an enclosure structure. The conductive film layer forms a shield enclosing the part or parts and protects against electromagnetic fields. The conductive film layer may be a radar neutral material. The radar neutral material may behave so that radar located in the vicinity of the wind turbine and radiating radar-RF energy in the direction of the wind turbine will receive a degraded amount or substantially no radar-RF energy reflected from the material at its receiver. However, this approach may not work well for a wind turbine, as it may increase the mass of the blade.

U.S. Patent Application Publication No. 2006/0169930 to Butler discloses an apparatus for reducing the electromagnetic radiation reflected from structures in the direction of electromagnetic radiation receiving equipment is disclosed. The apparatus is situated between an object and a source of electromagnetic radiation. The apparatus includes an array of at least one substantially reflective panel arranged such that the array reflects and disperses incident electromagnetic radiation away from the receiving equipment.

Another approach provides a radar absorbing blade. The radar absorbing blade may act like a Salisbury screen so that incoming radar waves bounce off two surfaces of the blade that are precisely spaced so that reflections interfere and cancel each other out. Such an approach has been proposed by Vestas Wind Systems of Randers, Denmark.

Another approach, proposed by the QinetiQ Company of Farnborough, Hampshire, modifies an inside portion of each blade with layers of circuits and reflectors that would reduce the strength of a radar return from the blades.

Other references disclose the use of different materials in a wind turbine, for example, U.S. Pat. No. 6,224,341 to Fricke discloses a fan blade that is selectively filled with a damping fill material. The damping fill material may include a ceramic material, an ore or refractory material, and glass microbubbles, and may depend on a given application, for example, a gas turbine blade.

U.S. Patent Application Publication No. 2004/0253114 to Gunneslov et al. discloses a wind turbine blade that includes pre-fabricated strips arranged in a sequence along an outer periphery of the wind turbine blade. The pre-fabricated strips may include carbon fibers, glass fibers, wood strips, or composite strips formed as hollow tubes.

SUMMARY OF THE INVENTION

In view of the foregoing background, it is therefore an object of the present invention to provide reduced radio frequency (RF) interaction. This and other objects, features, and advantages in accordance with the present invention are provided by a wind turbine electrical generator that may include a monopole tower extending upwardly from ground level and an electrical power generator that may be carried by an upper end of the monopole tower and including a horizontally extending drive shaft. The wind turbine electrical generator may also include a plurality of wind-driven blades carried by the horizontally extending drive shaft. The monopole tower may have an outer surface with a vertically extending outer corner therein defining a pair of adjacent vertical facets, for example. The monopole tower may be positioned with the vertically extending outer corner aligned with a land-based radar site so the pair of adjacent vertical facets reflects radar illumination away from the radar site to reduce an amount of the radar illumination reflected back to the land-based radar site. Accordingly, interaction, for example, radar backscatter and radar cross-section (RCS) from the wind turbine electrical generator at the land-based radar site is reduced.

Another aspect is directed to a method of positioning a wind turbine electrical generator. The wind turbine may include a monopole tower extending upwardly from ground level, an electrical power generator carried by an upper end of the monopole tower and including a horizontally extending drive shaft. The wind turbine may also include a plurality of wind-driven blades carried by the horizontally extending drive shaft.

The method may include positioning the monopole tower having an outer surface with a vertically extending outer corner defining a pair of adjacent vertical facets aligned relative to a land-based radar site so that the pair of adjacent vertical facets reflects radar illumination away from the radar site to reduce an amount of the radar illumination reflected back to the land-based radar site, for example.

The objects, features, and advantages in accordance with the present invention are also provided by another embodiment of a wind turbine electrical generator. The wind turbine electrical generator may include a tower extending upwardly from ground level and an electrical power generator carried by an upper end of the tower and may include a horizontally extending drive shaft. The wind turbine may also include a plurality of wind-driven composite blades carried by the horizontally extending drive shaft, for example. Each of the plurality of wind-driven composite blades may include a dielectric material and a magnetic material therein having respective properties and in relative proportions so that the composite blade has a relative permittivity and a relative permeability within ±10 percent of each other at a predetermined radar frequency, for example. Accordingly, interaction with radiation at the radar frequency from the wind turbine electrical generator is reduced.

A method aspect is directed to a method of making a wind turbine electrical generator that may include a tower extending upwardly from ground level, an electrical power generator carried by an upper end of the tower and including a horizontally extending drive shaft, and a plurality of wind-driven composite blades carried by the horizontally extending drive shaft. The method may include forming each of the plurality of wind-driven composite blades from a dielectric material and a magnetic material having respective properties and in relative proportions so that the composite blade has a relative permittivity and a relative permeability within ±10 percent of each other at a predetermined radar frequency, for example.

The objects, features, and advantages in accordance with the present invention are also provided by yet another embodiment of a wind turbine electrical generator that may include a tower extending upwardly from ground level, an electrical power generator carried by an upper end of the tower and including a horizontally extending drive shaft, and a plurality of wind-driven dielectric blades carried by the horizontally extending drive shaft. Each of the plurality of wind-driven dielectric blades may include a dielectric matrix and a plurality of hollow glass bubbles therein having respective properties and in relative proportions so that the dielectric blade has a relative permittivity within ±10 percent of the relative permittivity of air, for example. Accordingly, interaction with radiation at the radar frequency from the wind turbine electrical generator is reduced.

A method aspect is directed to a method of making a wind turbine electrical generator that may include a tower extending upwardly from ground level, an electrical power generator carried by an upper end of the tower and including a horizontally extending drive shaft, and a plurality of wind-driven dielectric blades carried by the horizontally extending drive shaft. The method may include forming each of the plurality of wind-driven dielectric blades from a dielectric matrix and a plurality of hollow glass bubbles having respective properties and in relative proportions so that the dielectric blade has a relative permittivity within ±10 percent of air, for example.

The objects, features, and advantages in accordance with the present invention are still further provided by still another embodiment of a wind turbine electrical generator. The wind turbine electrical generator may include a tower extending upwardly from ground level, and an electrical power generator carried by an upper end of the tower and including a horizontally extending drive shaft, for example. The wind turbine electrical generator may also include a plurality of wind-driven blades carried by the drive shaft. Each wind-driven blade may include a first electrically conductive element extending the length of the wind-driven blade, and a second electrically conductive element extending along at least a portion of the wind-driven blade in spaced relation from the first electrically conductive element and having an end coupled to the first electrically conductive element, for example. The second electrically conductive element may have a length and a coupling location with the first electrically conductive element so that the first and second electrically conductive elements cooperate to change an electromagnetic resonance relative to a preselected transmission frequency, for example. Accordingly, interaction with radiation at the preselected transmission frequency from the wind turbine electrical generator is reduced.

Another aspect is directed to a method of making a wind turbine electrical generator that may include a tower extending upwardly from ground level, an electrical power generator carried by an upper end of the tower and including a horizontally extending drive shaft, and a plurality of wind-driven blades carried by the drive shaft. The method may include forming each wind-driven blade to include a first electrically conductive element extending the length thereof, and forming each wind-driven blade to include a second electrically conductive element extending along at least a portion thereof in spaced relation from the first electrically conductive element coupled at an end thereof to the first electrically conductive element, for example. The second electrically conductive element may have a length and a coupling location with the first electrically conductive element so that the first and second electrically conductive elements cooperate to change an electromagnetic resonance relative to a predetermined transmission frequency, for example.

BRIEF DESCRIPTION OF THE DRAWINGS

FIG. 10 is a greatly enlarged cross-sectional view of a portion of a wind-driven blade of the wind turbine electrical generator of FIG. 9.

FIG. 11 is a schematic view of a fourth embodiment of a wind turbine electrical generator in accordance with the present invention.

FIG. 12 is a greatly enlarged top view of a portion of a wind-driven blade of the wind turbine electrical generator of FIG. 11.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

Figure 1:
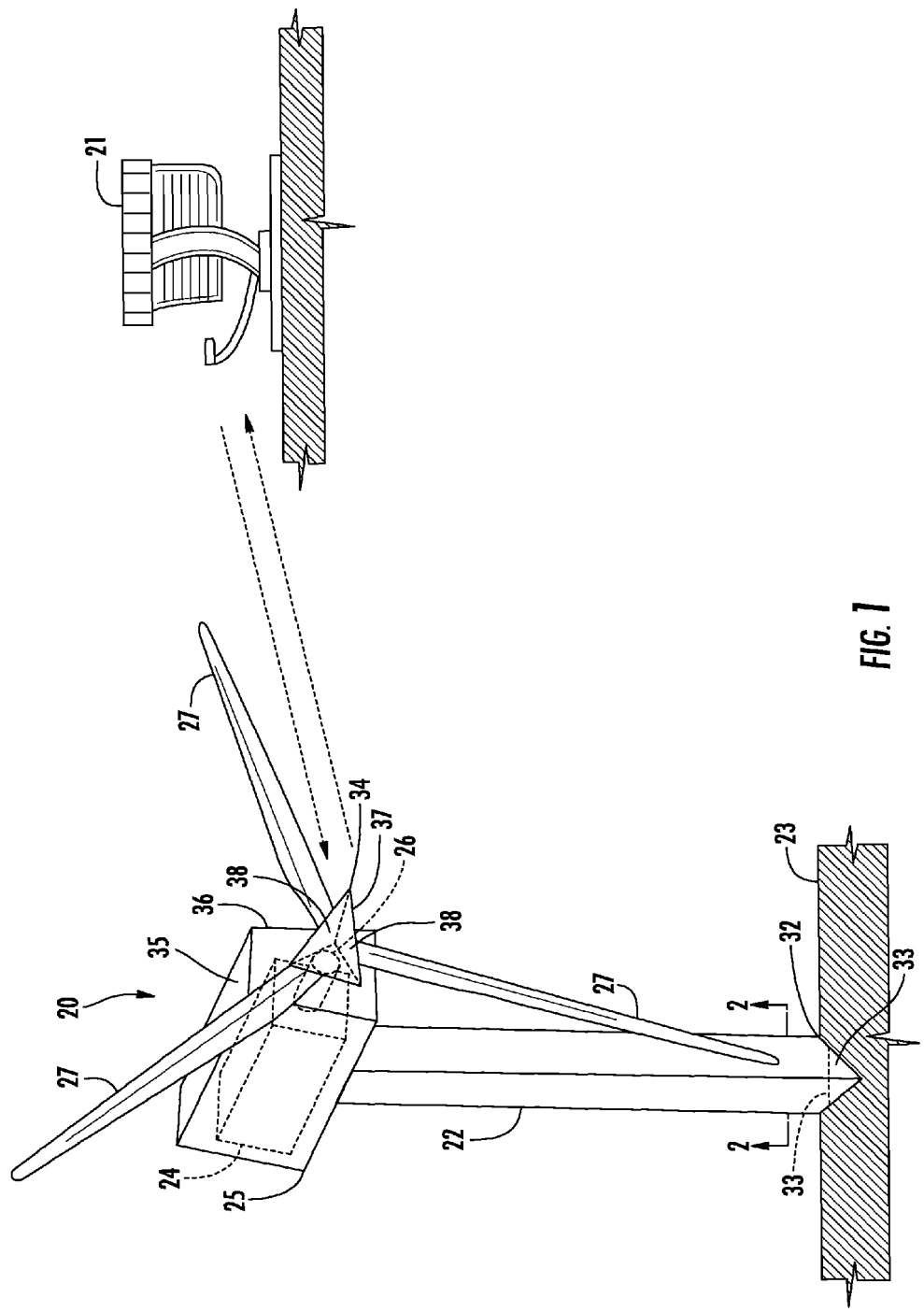
FIG. 1 is a schematic perspective view of a first embodiment of a wind turbine electrical generator in accordance with the present invention.

Referring initially to FIG. 1, a wind turbine electrical generator 20 is positioned within a radar range of a land-based radar site 21. The wind turbine electrical generator 20 includes a monopole tower 22 extending upwardly from ground level 23. The monopole tower 22 may be metal, fiberglass, or other material, for example, as will be appreciated by those skilled in the art.

The wind turbine electrical generator 20 also includes an electrical power generator 24 carried by an upper end of the monopole tower 22. The electrical power generator 24 includes a horizontally extending drive shaft 26. The electrical power generator 24 advantageously generates electrical power from the turning of the horizontally extending drive shaft 26, as will be appreciated by those skilled in the art.

A plurality of wind-driven blades 27 is carried by the horizontally extending drive shaft 26. Each wind-driven blade 27 may be a metal material or a composite material, for example, a fiberglass material. Each wind-driven blade 27 may be other materials, as will be appreciated by those skilled in the art. Wind drives the plurality of blades 27 so that the horizontally extending drive shaft 26 turns to produce electrical power.

The monopole tower 22 has a continuous outer surface with a vertically extending outer corner 32 therein defining a pair of adjacent vertical facets 33. The monopole tower 22 is positioned with the vertically extending outer corner 32 aligned with the land-based radar site 21 so that neither of the pair of adjacent vertical facets 33 reflects radar illumination back to the radar site. In other words, radar reflections from the radar site 21 are reflected away from the radar site by the adjacent facets 33. This advantageously may reduce interaction, for example, the radar backscatter and reflectivity from the wind turbine electrical generator 20.

The monopole tower 22 is illustratively triangular in shape. In some embodiments, a cover (not shown) may be applied to a circular monopole tower, for example, to give it a triangular shape. Other monopole tower shapes may be used.

Figure 2:
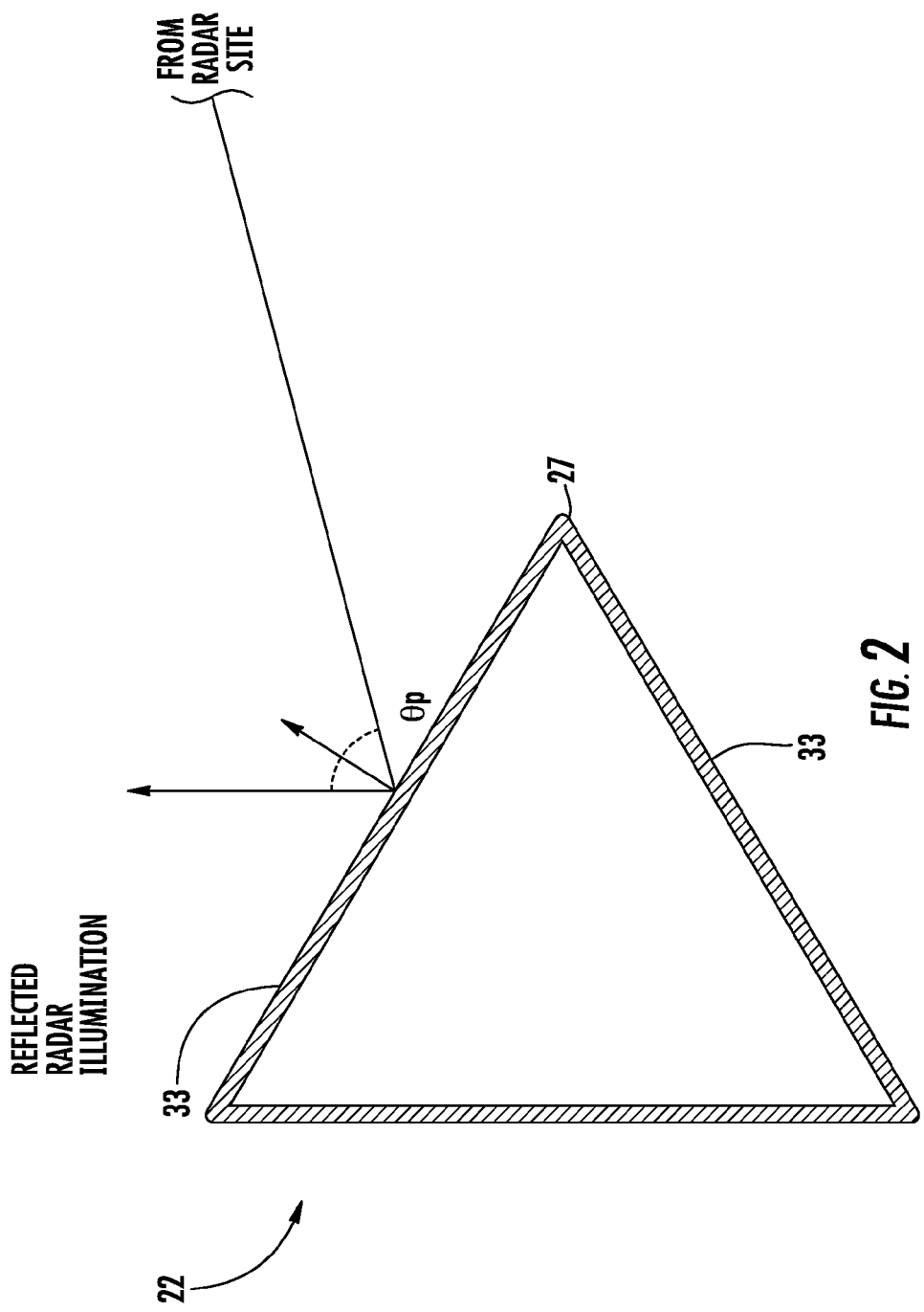
FIG. 2 is a cross-sectional view taken along the line 2-2 of FIG. 1.

Referring additionally to FIG. 2, each of the pair of adjacent vertical facets 33 may be positioned so that they are at an angle $\theta_p$ of 45-degrees from normal to the radar site, or the direction of the radar illumination. For a triangular shaped monopole tower 22 positioned with the vertically extending outer corner 32 aligned with the land-based radar site 21 so that each of the pair of adjacent vertical facets 33 are 45-degrees from normal to the radar site, the radar illumination may be reflected about 135 degrees to the left and right of the direction of the radar illumination.

As will be appreciated by those skilled in the art, aligning the vertically extending outer corner 32 with the land-based radar site 21 so that each of the pair of adjacent vertical facets 33 are 45-degrees from the direction of the radar illumination, or normal to the radar site, advantageously provides increased directional reflectivity away from the radar site. Of course, the monopole tower 22 may be positioned with the vertically extending outer corner 32 aligned with the land-based radar site 21 so that each of the pair of adjacent vertical facets 33 is another amount of degrees from the direction of the radar illumination, or normal to the radar site.

For example, in some embodiments, the monopole tower 22 may be positioned so that neither of the pair of adjacent vertical facets 33 is less than an angle $\theta_p$ of 5 degrees from normal to the radar site. In embodiments where the monopole tower 22 is be positioned so that neither of the pair of adjacent vertical facets 33 is less than 5 degrees from normal to the radar site, it may be desirable to add a radar reflective material or radar absorbent coating (not shown) to the monopole tower 22 to further reduce reflected radar illumination back to the land-based radar site 21.

As will be appreciated by those skilled in the art, the angle of incidence is about equal to the angle of refraction or reflection, independent of the material properties (i.e. the monopole tower 22). Thus, the vertically extending outer corner 32 may be aligned with the land-based radar site 21 so that each of the pair of adjacent vertical facets 33 increases the angle at which the radar illumination is reflected so that radar illumination is not reflected back to the radar site.

Figure 3:
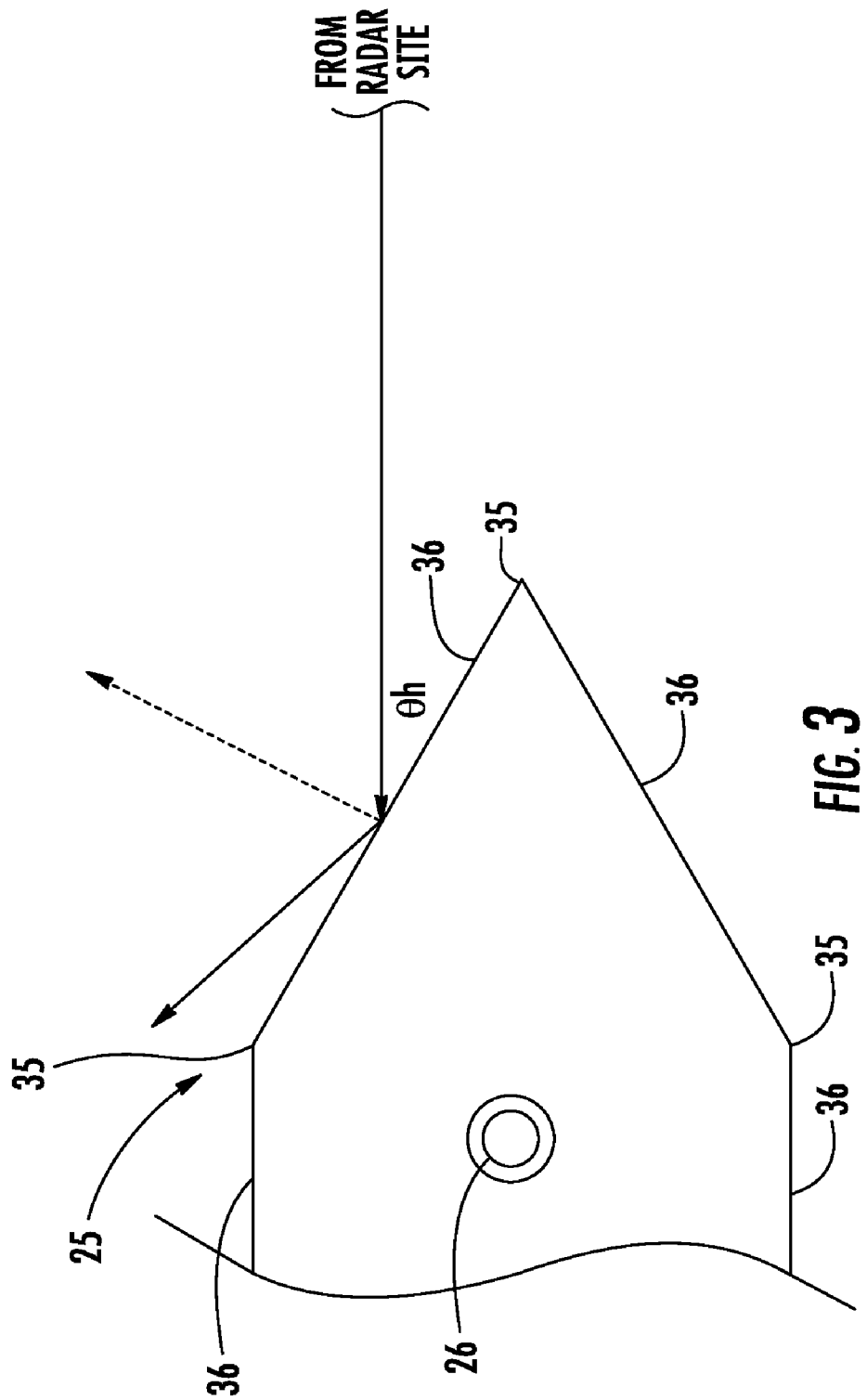
FIG. 3 is a side elevational view of a portion of the housing of the wind turbine electrical generator of FIG. 1.

Referring additionally to FIG. 3, the wind turbine electrical generator 20 also includes a housing 25 carried by the upper end of the monopole tower 22. The housing 25 surrounds the electrical power generator 24 and has an outer surface with an outer corner 35 therein defining a pair of adjacent housing facets 36. The housing 25 is positioned with the outer corner 35 aligned with the land-based radar site 21 so that neither of the pair of adjacent facets 36 reflects radar illumination back to the radar site. Similar to the monopole tower 22, the housing 25 may be aligned so that neither of the pair of adjacent facets is less than an angle $\theta_h$ of 5 degrees from normal to the radar site. In the illustrated embodiment, the outer corner 35 extends horizontally, although in other embodiments the outer corner could extend vertically or at a diagonal.

Figure 4:
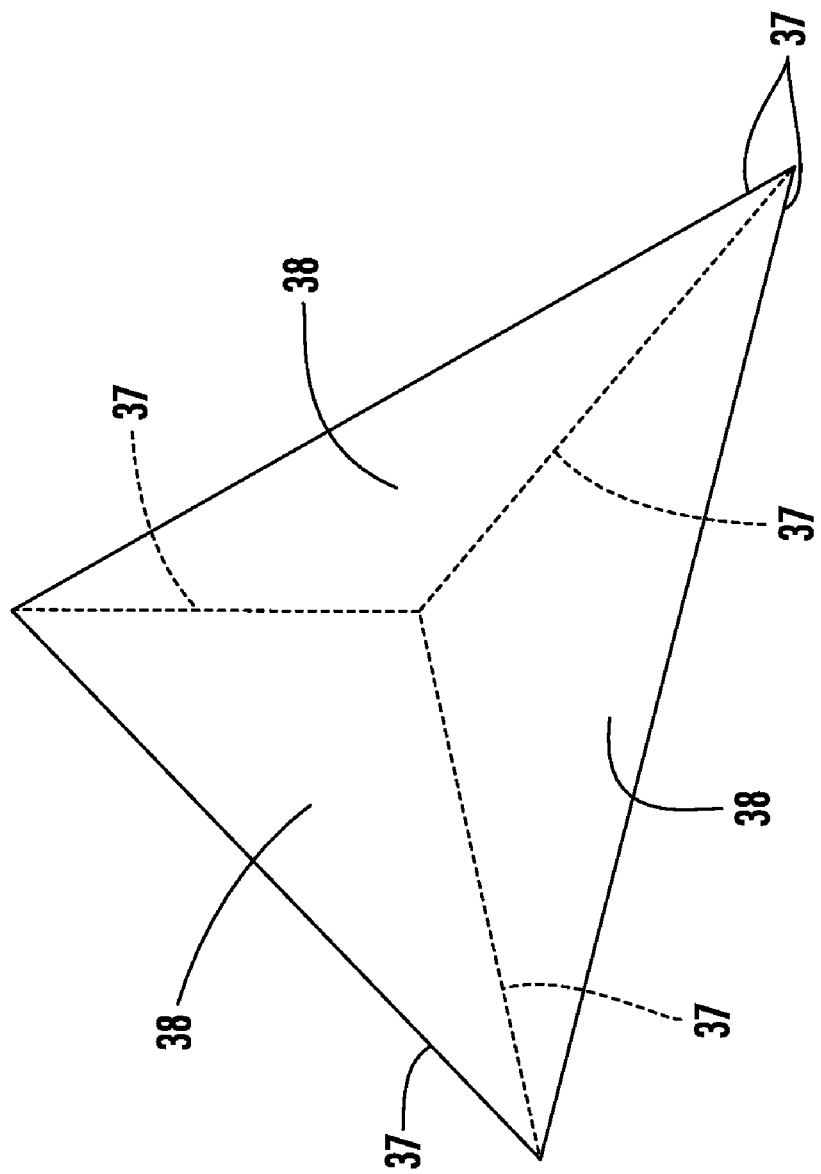
FIG. 4 is a perspective view of the hub cover of the wind turbine electrical generator of FIG. 1.

Referring additionally to FIG. 4, the wind turbine electrical generator 20 also includes a hub cover 34 coupled to the drive shaft 26. The hub cover 34 is sized to be positioned to cover openings in the housing 25, for example, from the drive shaft 26.

The hub cover 34 has an outer surface with an outer corner 37 defining a pair of adjacent cover facets 38. The hub cover 24 is positioned with the outer corner 37 aligned with the land-based radar site 21 so that neither of the pair of the adjacent cover facets 38 reflects radar illumination back to the radar site. The hub cover 34 may be metallic or a composite material, for example, a fiberglass material. The hub cover 34 may be other materials, as will be appreciated by those skilled in the art.

The hub cover 34 has a continuous outer surface and is tetrahedral in shape. In other words, the hub cover 34 is the inverse of a corner reflector, as will be appreciated by those skilled in the art. The tetrahedral shape advantageously provides a decreased radar cross-section, and may provide no radar return for about 60 degrees around the axis of rotation (i.e. the drive shaft 26). The hub cover 34 may be other shapes and may have other outer surface features to reduce the radar cross-section.

A method aspect is directed to a method of positioning a wind turbine electrical generator 20 within a radar range of a land-based radar site 21. The method includes positioning a monopole tower having an outer surface with a vertically extending outer corner 32 defining a pair of adjacent vertical facets 33 aligned relative to the land-based radar site 21. The pair of adjacent vertical facets 33 is aligned so that neither of the pair of adjacent vertical facets reflects radar illumination back to the radar site 21.

Figure 5:
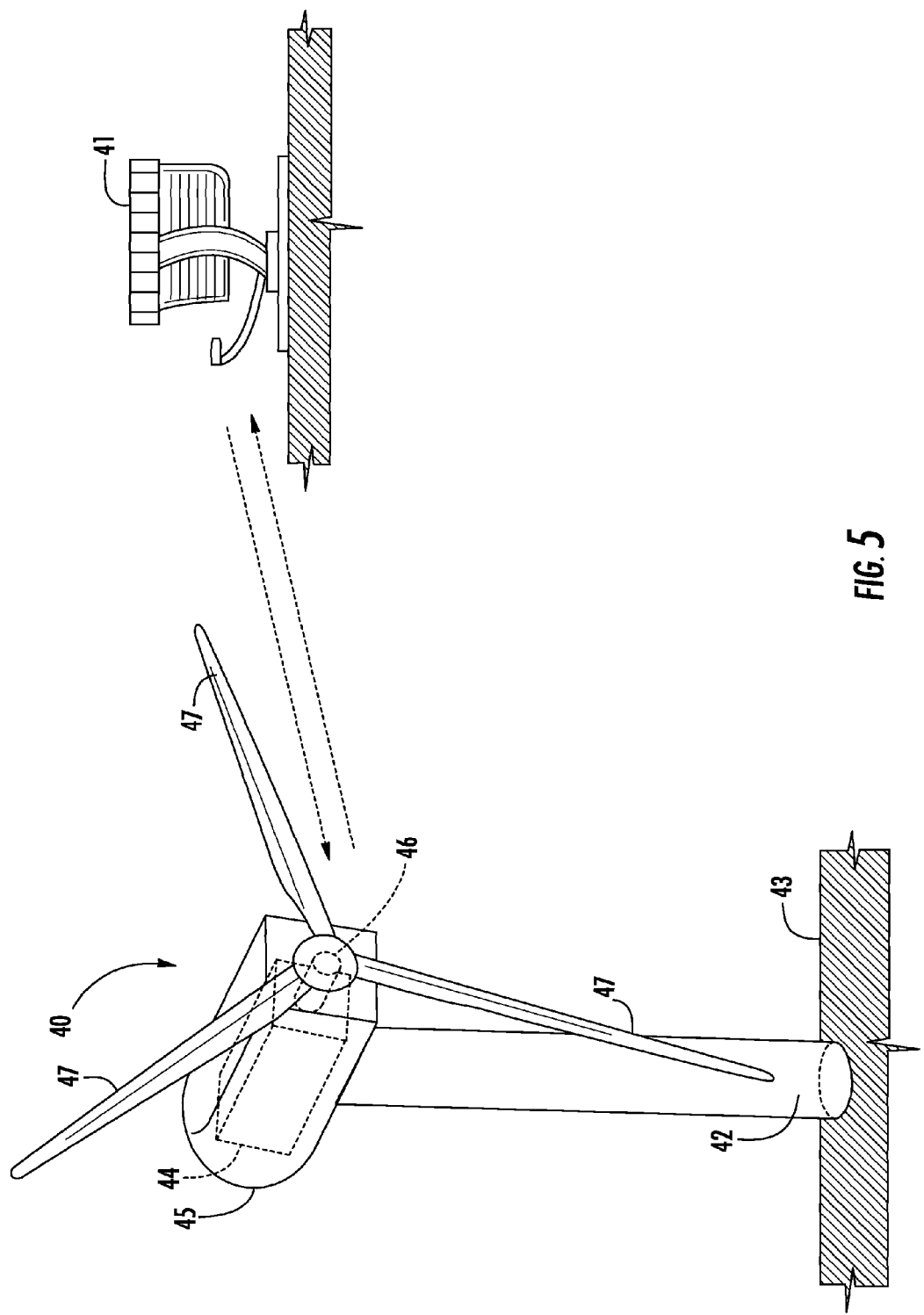
FIG. 5 is a schematic view of a second embodiment of a wind turbine electrical generator in accordance with the present invention.

Referring now to FIG. 5, another embodiment is now described of a wind turbine electrical generator 40 positioned within a radar range of a land-based radar site 41. The wind turbine electrical generator 40 includes a tower 42 extending upwardly from ground level 43 and an electrical power generator 44 carried by an upper end of the tower. The electrical power generator includes a horizontally extending drive shaft 46. The wind turbine electrical generator 40 also includes a plurality of wind-driven composite blades 47 carried by the horizontally extending drive shaft 46.

Figure 6:
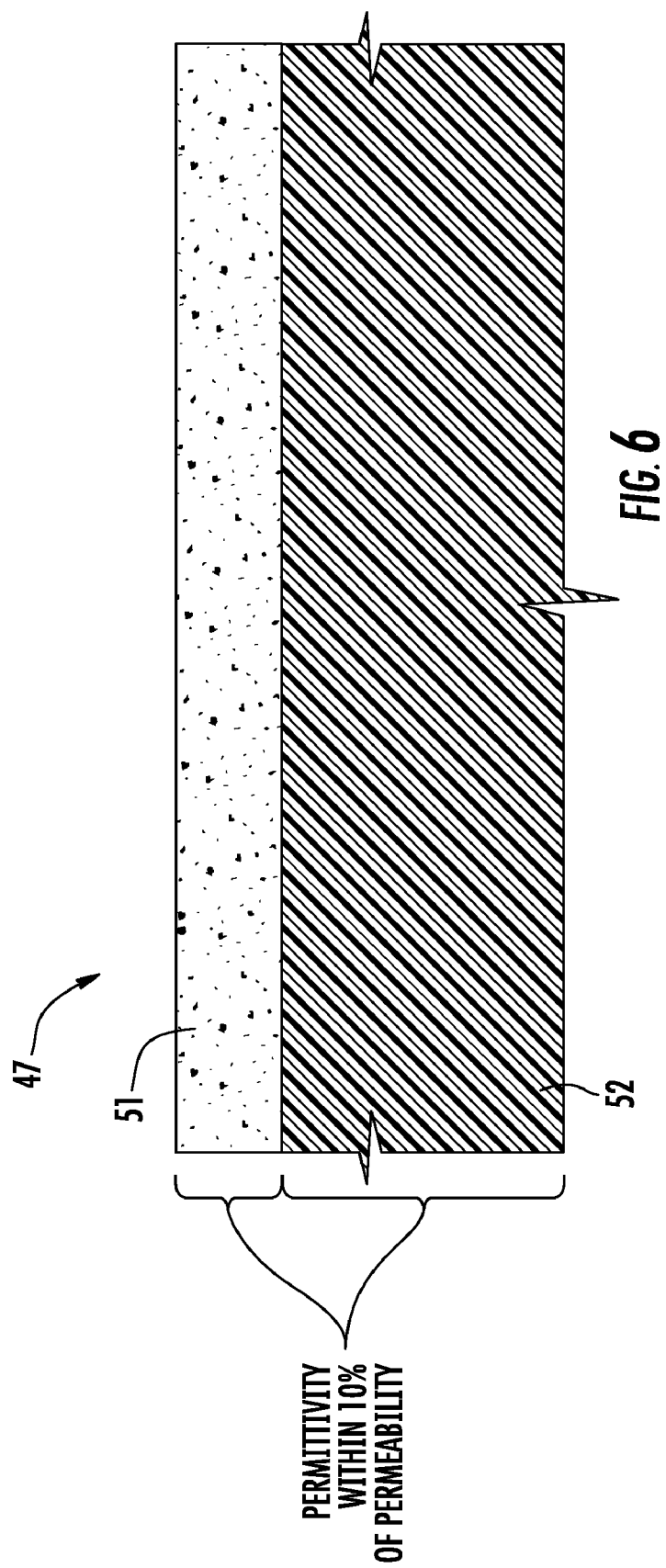
FIG. 6 is a greatly enlarged cross-sectional view of a portion of a wind-driven blade of the wind turbine electrical generator of FIG. 5.
Figure 7:
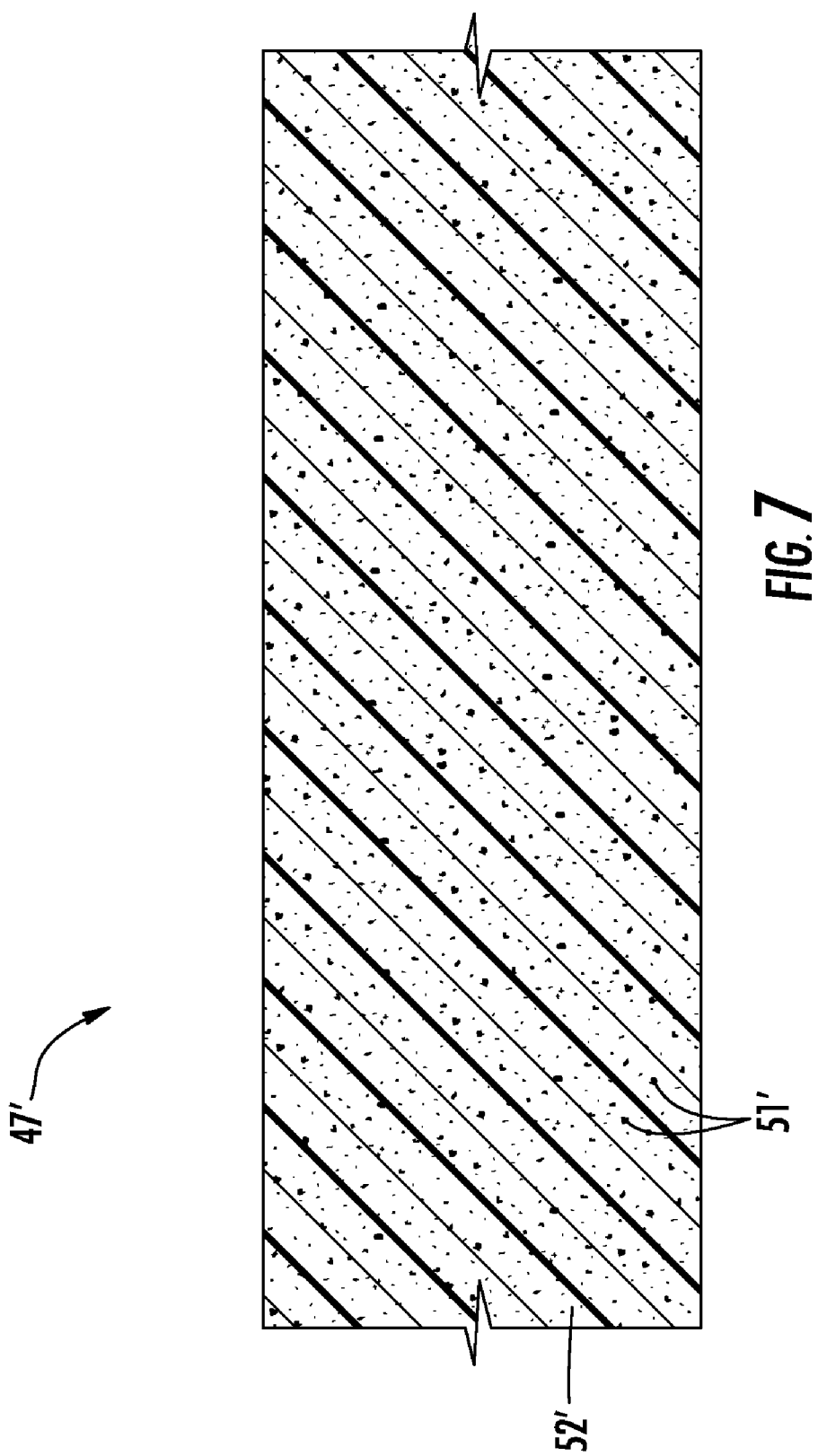
FIG. 7 is a greatly enlarged cross-sectional view of another variation of a wind-driven blade to be used with the wind turbine electrical generator of FIG. 5.
Figure 8:
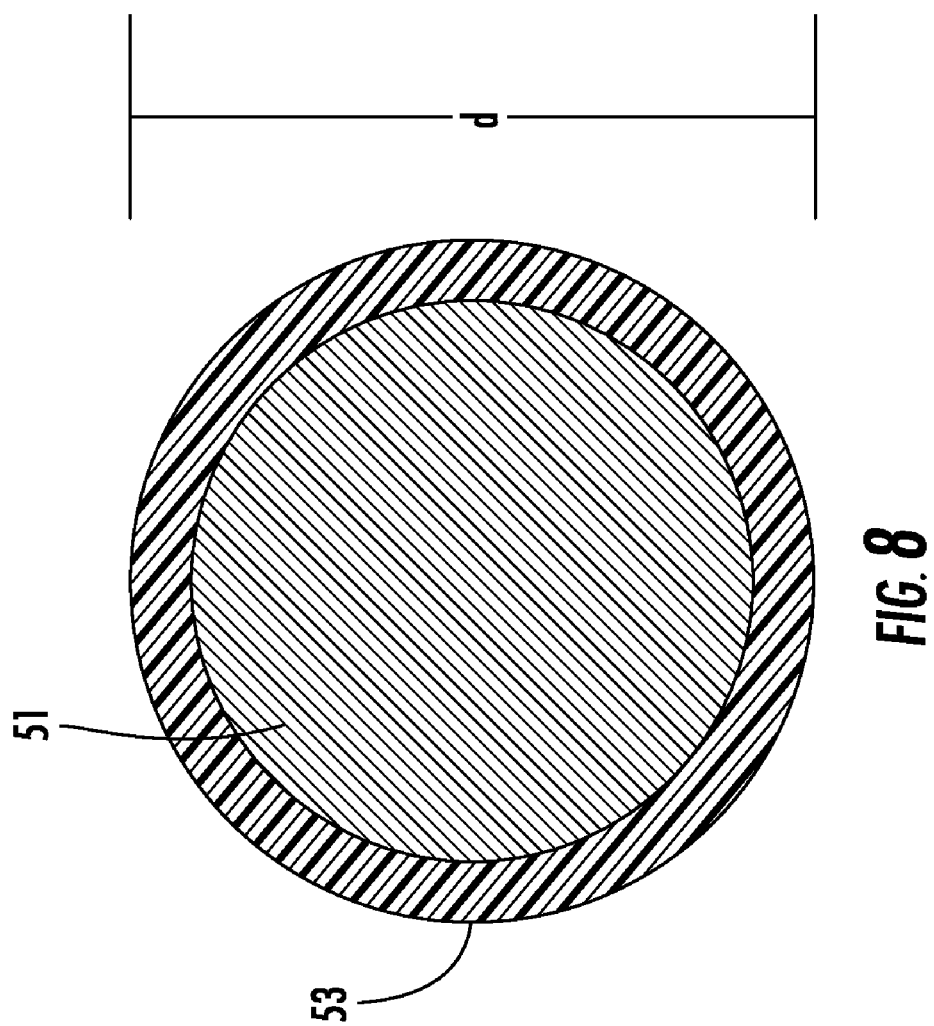
FIG. 8 is a schematic cross-sectional view of an insulated magnetic particle used in either of the wind-driven blades of FIGS. 6 and 7.

Referring additionally to FIGS. 6-8, each of the plurality of wind-driven blades 47 of the wind turbine electrical generator 40 is a composite blade and includes a dielectric material 52 and a magnetic material 51 therein. The magnetic material 51 and the dielectric material 52 have respective properties in relative proportions so that each composite blade 47 has a relative permittivity and a relative permeability within ±10 percent of each other at the typical commercial FAA airport radar operating frequency in the range of 1,330-1,350 MHz, for example. Each composite blade 47 may be nonconductive.

The relative permeability and relative permittivity are frequency dependent, and may thus be determined for a particular radar frequency. By designing each composite blade 47 to have a relative permittivity and a relative permeability within ±10 percent of each other at the radar frequency, the composite blade 47 advantageously reduces the reflected radar illumination back to the radar site 41. In other words, each composite blade 47 has an increasingly transparent appearance to the radar site 41. In other embodiments, each composite blade 47 may have a relative permittivity and a relative permeability within ±5 percent of each other at the radar frequency.

Following the equation:

$$\Gamma=(\eta_2-\eta_1)/(\eta_2+\eta_1)$$

where $\Gamma$ is the reflection of the radar illumination from the radar site 41, $\eta_1$ is the intrinsic impedance of air, which is about 377 ohms, and $\eta_2$ is the intrinsic impedance of the blade 47 we can arrive at:

$$\Gamma_n=120\pi\sqrt{(\mu_r/\in_r)}$$

where:
$\Gamma_n$ is the reflection coefficient;
$\mu_r$ is the relative magnetic permeability; and
$\in_r$ is the relative permittivity.

By making the relative permeability $\mu_r$ be within ±10 percent of the relative permittivity $\in_r$ in each wind-driven composite blade 47, following the equation above, the reflection $\Gamma_n$ may be near zero as $\eta=120\pi$ both in air and in the composite blade, and as the numerator of the equation above for $\Gamma$ may be near zero. This advantageously reduces the reflected radar illumination back to the radar site 41, as each wind-driven composite blade 47 may appear transparent to the radar site. In other words, the radar illumination may pass through each wind-driven composite blade 47.

The magnetic material 51 may be a layer, or coating, of magnetic material formed over the outside of each wind-driven composite blade 47 (FIG. 6). When the magnetic material 51 is applied as a layer, graphite powder (not shown) may be added to the magnetic material. This may advantageously dissipate heat as conductivity may be increased. As will be appreciated by those skilled in the art, when the radar illumination enters the wind-driven composite blade 47, an eddy current is generated. The graphite powder may increase absorption of the eddy current. In another embodiment (FIG. 7) the magnetic material 51' includes magnetic particles distributed within the dielectric material 52'.

The magnetic material 51 may be an iron powder, for example, a carbonyl iron powder that may have an insulative coating 53 (FIG. 8). The insulative coating 53 may be formed by applying a phosphoric acid wash to each carbonyl iron powder particle 51. More particularly, the insulative coating 53 may be a black oxide coating. The insulative coating 53 advantageously may reduce the electric conductivity of each particle 51 that may otherwise create a mirror for the radar illumination.

The carbonyl iron powder is available from BASF SE of Ludwigshafen, Germany. The size of each iron powder particle 51 may be determined based upon a skin depth at the radar frequency. For example, each particle 51 may have a diameter d (FIG. 8) less than or equal to the calculated skin depth at the radar frequency.

For example, the diameter of each iron powder particle 51 may be determined according to:

$$\delta = (1/\sqrt{(\pi\mu_o)})(\sqrt{(\rho/\mu_r f)}) \approx 503(\sqrt{(\rho/\mu_r f)})$$

where:
$\delta$ = the skin depth in meters;
$\mu_o = 4\pi \times 10^{-7}$ H/m;
$\mu_r$ = the relative permeability of the medium;
$\rho$ = the resistivity of the medium in ohms; and
f = the frequency of the wave in Hz.

The magnetic particles 51 may be a nickel zinc powder, for example, nickel zinc spinel powder. The dielectric material 52 may be fiberglass, a carbon fiber, or resin, for example. Other magnetic material particles and other dielectric materials may be used as will be appreciated by those skilled in the art.

By matching the permittivity with the permeability in the blade material, the thickness of the composite blade 47 may be less of a concern. Additionally, as the composite blade 47 may be nonconductive and non-dissipative so that RF radiation passes through it, tuned layers may not be desired. The composite blade 47 may have increased transparency to RF radiation.

A method aspect is directed to a method of making a wind turbine electrical generator which includes forming each of the plurality of wind-driven composite blades 47 to include a dielectric material 52 and a magnetic material 51 therein. The dielectric material 52 and magnetic material 51 have respective properties and in relative proportions so that the composite blade 47 has a relative permittivity and a relative permeability within ±10 percent of each other at the radar frequency.

Figure 9:
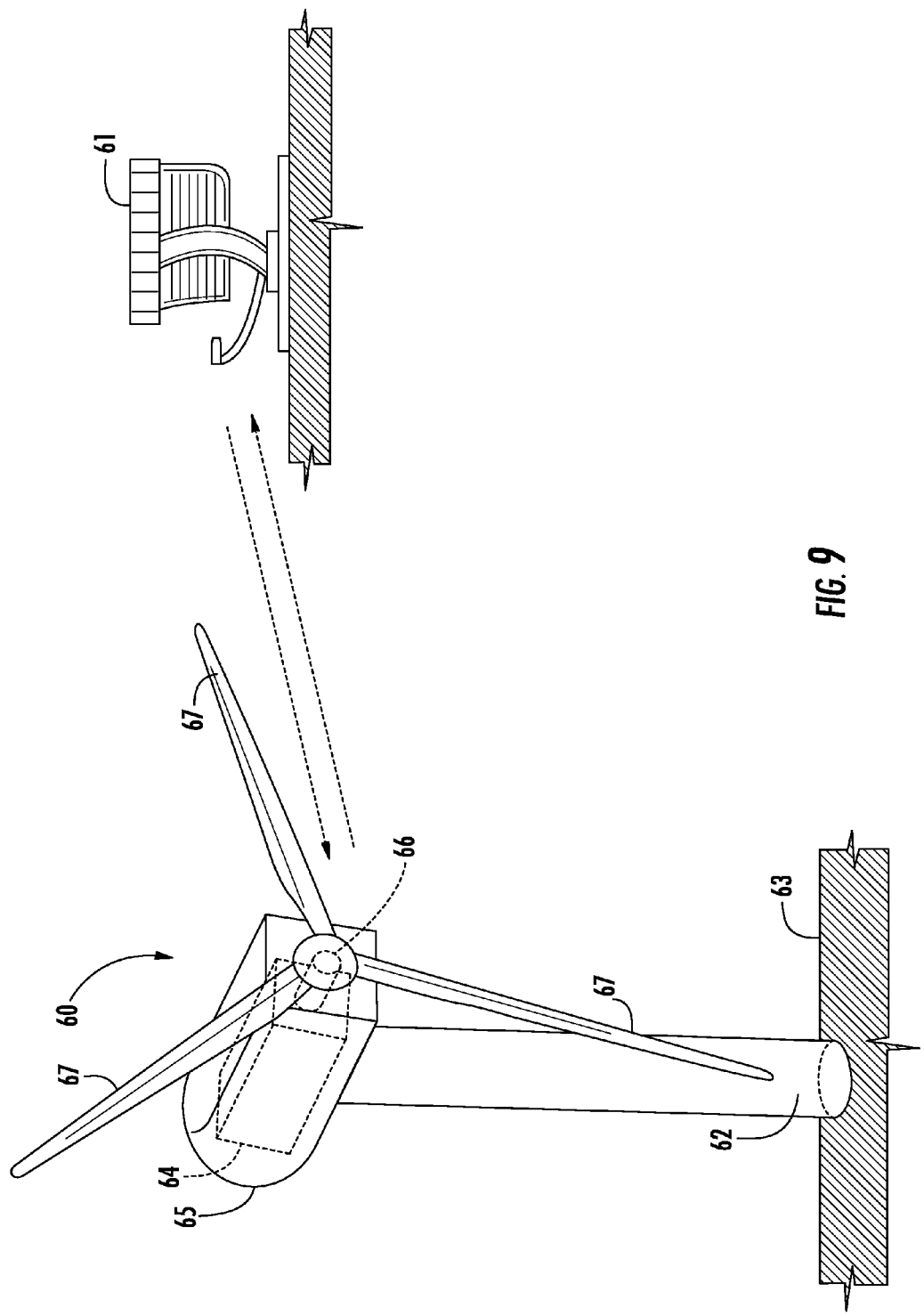
FIG. 9 is a schematic view of a third embodiment of a wind turbine electrical generator in accordance with the present invention.
Figure 17:
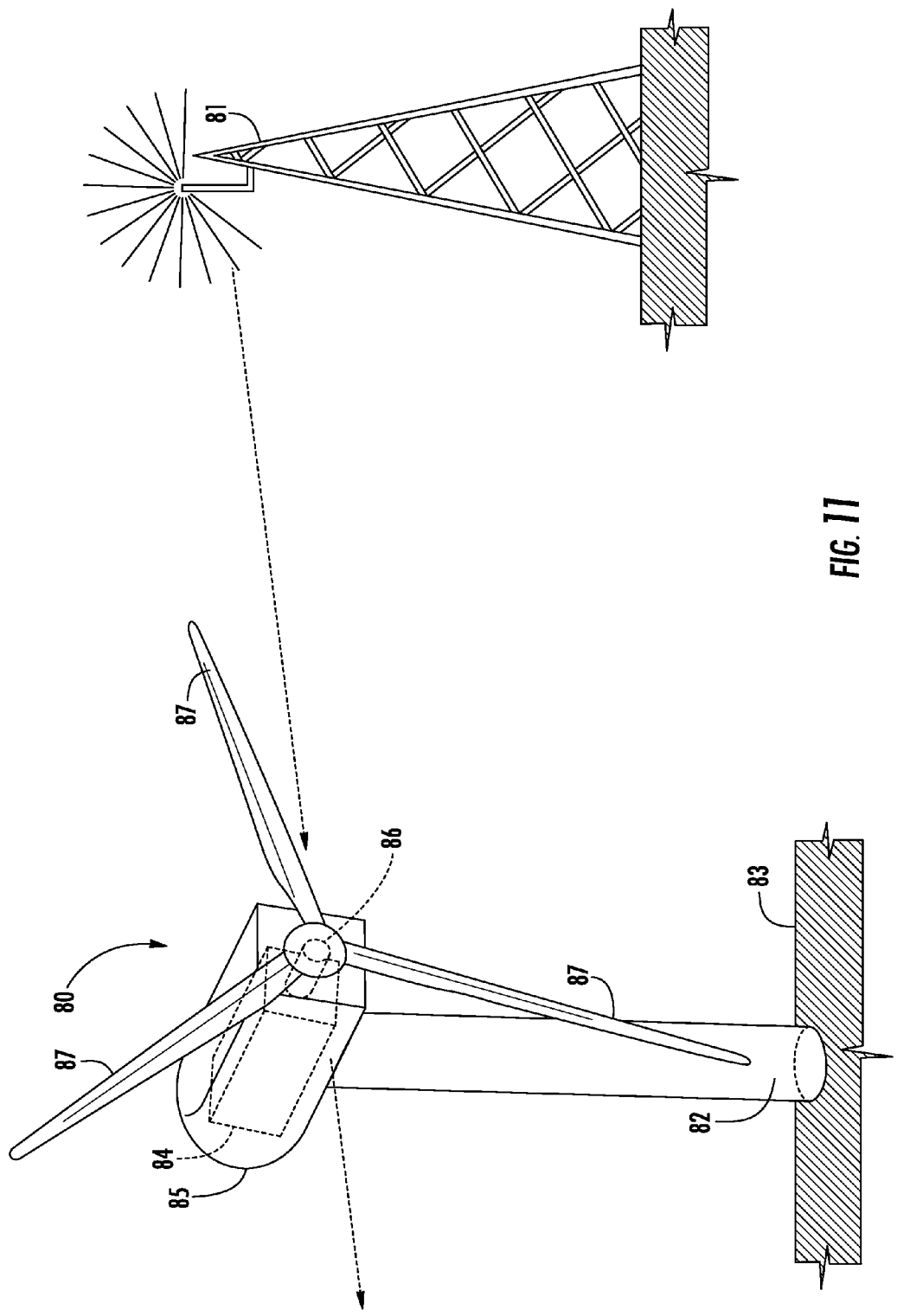

Referring now to FIG. 9, another embodiment is now described of a wind turbine electrical generator 60 positioned within a radar range of a radar site 61. The wind turbine electrical generator 60 includes a tower 62 extending upwardly from ground level 63, and an electrical power generator 64 carried by an upper end of the tower. The electrical power generator 64 includes a horizontally extending drive shaft 66. The wind turbine electrical generator 60 also includes a plurality of wind-driven dielectric blades 67 carried by the horizontally extending drive shaft 66.

Referring additionally to FIG. 10, each of the wind-driven blades 67 is a dielectric blade and includes a dielectric matrix 71 and a plurality of hollow glass bubbles 72 therein. Each of the plurality of wind-driven dielectric blades 67 has respective properties and in relative proportions so that the dielectric blade has a relative permittivity within ±10 percent of air. More preferably, each dielectric blade 67 may have a relative permittivity within ±5 percent of air.

Reducing the density of each of the wind-driven dielectric blades 67 advantageously reduces the permittivity $\in_r$ and thus may reduce backscatter, or reflected radar illumination back to the radar site 61. For example, referring to the following equation:

$$\Gamma = (\eta_2 - \eta_1)/(\eta_2 + \eta_1)$$

where $\Gamma$ is the reflection of the radar illumination from the land based radar site 61, $\eta_1$ is the intrinsic impedance of air, and $\eta_2$ is the intrinsic impedance of the blade 67 we can arrive at:

$$\eta_n = 120\pi\sqrt{(\mu_r/\in_r)}$$

where:
$\eta_n$ is the intrinsic or wave impedance of the material;
$\mu_r$ is the relative magnetic permeability; and
$\in_r$ is the relative permittivity.

By adding the hollow glass bubbles 72, the density of each dielectric blade 67 is reduced. By reducing the density of each dielectric blade 67, the relative permittivity $\in_r$ in each dielectric blade is also reduced, which thus reduces the reflection coefficient $\Gamma_n$. Because the hollow glass bubbles 72 are mostly air such that $\eta_2 \approx \eta_{air}$, $\Gamma_n$ may be near zero. This advantageously reduces the reflected radar illumination back to the radar site 61, as each wind-driven dielectric blade 67 may appear transparent to the radar site. In other words, the radar illumination may pass through each wind-driven dielectric blade 67. By reducing the permittivity of the dielectric blade 67 with glass bubbles, less magnetic loading material may be used in the blade to achieve isoimpedance with the air, e.g. an intrinsic impedance of $120\pi$ ohms is approximated in the blade at a relatively light weight.

The hollow glass bubbles 72 may be uniformly distributed within the dielectric matrix 71. The hollow glass bubbles 72 may be, for example, type K11 glass bubbles available from the 3M Company, of Maplewood, Minn. The hollow glass bubbles 72 may be soda-lime-borosilicate hollow bubbles, as will be appreciated by those skilled in the art.

The hollow glass bubbles 72 may have a density between 0.10 and 0.13 grams per cubic centimeter, and more particularly, may have a density of 0.11 grams per cubic centimeter. The hollow glass bubbles 72 may also have a crush strength of at least 200 pounds per square inch. An increased crush strength advantageously allows the hollow glass bubbles 72 to be used in a wind-driven blade 67, which may be exposed to increased forces from movement and weather conditions. Other types of hollow glass bubbles 72 may be used, as will be appreciated by those skilled in the art.

The dielectric matrix 71 may be fiberglass or a fiberglass-like composite. In other embodiments, the dielectric matrix 71 may be Epon™ Resin 828, available from Hexion Specialty Chemicals, Inc. of Columbus, Ohio, and include quartz type E glass fibers. The dielectric matrix 71 may be other materials.

A method aspect is directed to a method of making a wind turbine electrical generator 60 which includes forming each wind-driven dielectric blade 67 to include a dielectric matrix 71 and hollow glass bubbles 72 therein having respective properties. The dielectric matrix 71 and the hollow glass bubbles 72 are in relative proportions so that the dielectric blade 67 has a relative permittivity within ±10 percent of air.

Referring now to FIG. 11, another embodiment is now described of a wind turbine electrical generator 80 that is positioned within a range of a broadcast transmitter site 81, for example, an amplitude modulation (AM) radio transmitter site. The wind turbine electrical generator 80 includes a tower 82 extending upwardly from ground level 83 and an electrical power generator 84 carried by an upper end of the tower and including a horizontally extending drive shaft 86. The wind turbine electrical generator 80 also includes wind-driven blades 87 carried by the drive shaft 86.

Figure 13:
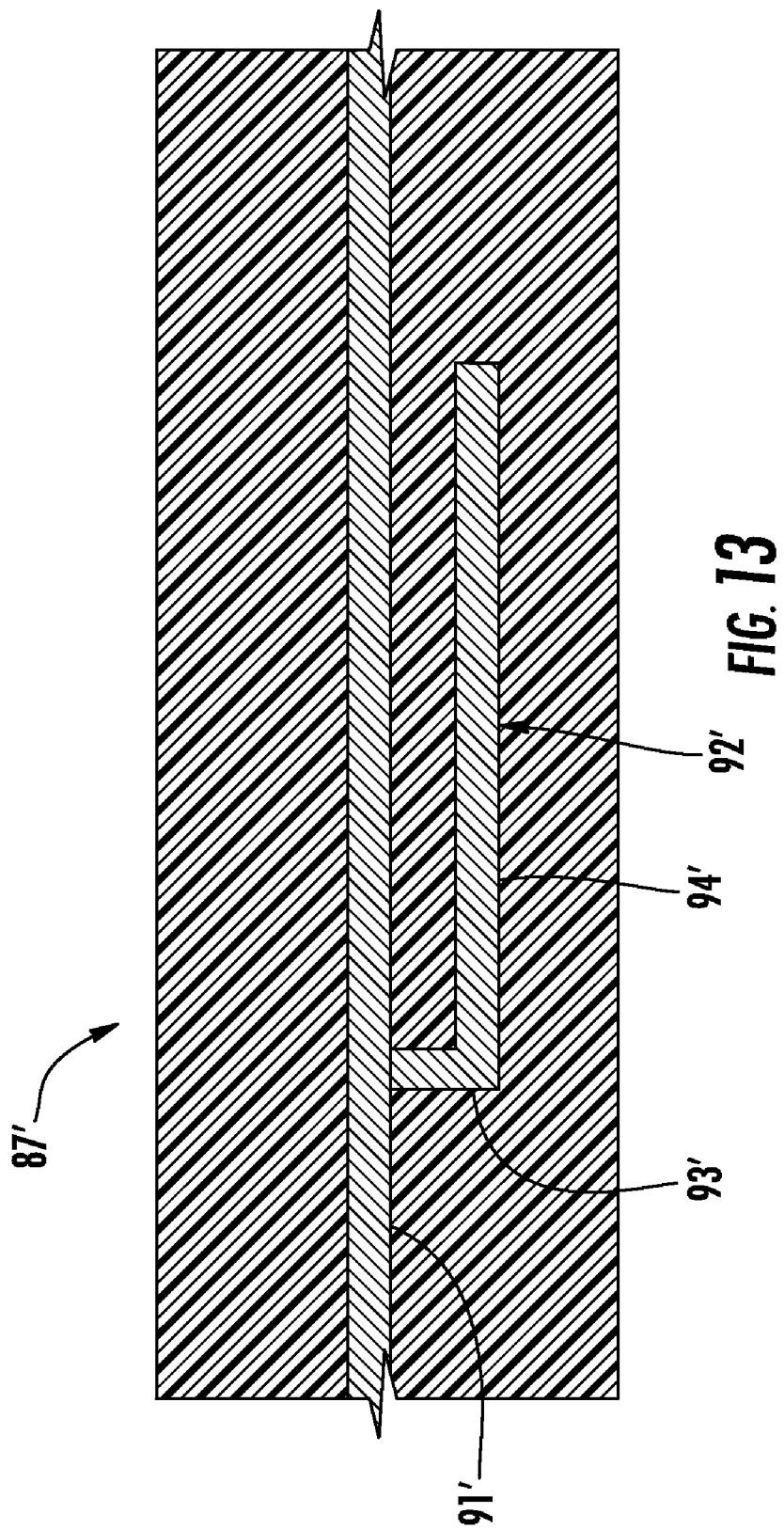
FIG. 13 is a greatly enlarged cross-sectional view of another variation of a wind-driven blade to be used in the wind turbine electrical generator of FIG. 11.

Referring now additionally to FIGS. 12 and 13, each wind-driven blade 87 includes a first electrically conductive element 91 extending the length of the blade 87. The first electrically conductive element 91 may be electrically coupled to the blade 87 at one end, for example. Alternatively, the first electrically conductive element 91 may be electrically floating.

Each wind-driven blade 87 also includes a second electrically conductive element 92 extending along at least a portion of the blade 87. The second electrically conductive element 92, which forms a folded conductor, is in spaced relation from the first electrically conductive element 91 and has an end coupled to the first electrically conductive element. The second electrically conductive element 92 is coupled at an end closer to the drive shaft 86. The second electrically conductive member 92 extends outwardly in spaced relation away from the drive shaft 86.

The second electrically conductive member 92 is L-shaped. In other words, the second electrically conductive element 92 includes a first portion 93 at the end. The first portion 93 extends transverse to the first electrically conductive element 91. The second electrically conductive element 92 also includes a second portion 94 that is transverse to the first portion 93. The second portion 94 extends along at least a portion of the length of the wind-driven blade 87 in spaced relation from the first electrically conductive element 91.

The second electrically conductive element 92 may be coupled to the first electrically conductive element 91 at a current maxima. The coupling location of the first and second electrically conductive elements 91, 92 is based upon the frequency of the broadcast transmitter 81. The broadcast transmitter 81 may be a directional broadcast transmitter, for example, a Standard Broadcast transmitter, or an AM broadcast transmitter. Other types of broadcast transmitters may be used. Typical commercial broadcast stations may operate in the frequency band of about 530-1710 kHz, for example. For example, the wind driven turbine blade 87 having an electromagnetic resonance at a broadcast station frequency may "detuned" about twenty percent or to reduce interaction. Detuning may include the moving of the resonant frequency of a structure. A relatively thin conductive structure may have a resonance at odd multiples of:

$$L=0.98(0.5)c/f$$

Where:
c=the speed of light in m/s
f=the radio frequency in hertz
The length of the second electrically conductive element 92, e.g. the detuning arm, may be about:

$$L_{92}=0.25c/f$$

Where:
$L_{92}$=the length of the detuning arm/second portion 92

The second electrically conductive element 92 acts like a series inductor or a detuning member to the first electrically conductive element 91. The second electrically conductive element may be applied to any portion of the wind turbine structure as required to control interaction.

The length of the second electrically conductive element 92 and a coupling location of the second electrically conductive element with the first electrically conductive element 91 allow cooperation therebetween to change an electromagnetic resonance of the blades 87 relative to a transmission frequency of the broadcast transmitter site. This advantageously reduces interference with the broadcast transmitter 81 that may be caused by the blades and other conductive structural members of a wind turbine, for example, a conductive tower, a conductive housing, and/or a conductive hub, which may all cause interference. Additionally, the first and second electrically conductive elements 91, 92 may cooperate to change the electromagnetic resonance of the blades relative to the nearby broadcast station. The resonance may be shifted either upwards to higher frequencies or downwards to lower frequencies to mitigate or reduce interaction, as will be appreciated by those skilled in the art.

In some embodiments, the first and second electrically conductive members 91, 92 may be surface mounted on each blade 87 (FIG. 12). Alternatively, the first and second electrically conductive members 91', 92' may be embedded within each blade 87' (FIG. 13). Other mounting arrangements of the first and second electrically conductive members 91, 92 will be appreciated by those skilled in the art.

A method aspect is directed to a method of making a wind turbine electrical generator 80 to be positioned within a range of a broadcast transmitter site 81 by forming each wind-driven blade 87 to include a first electrically conductive element 91 extending the length thereof. The method also includes forming each wind-driven blade 87 to include a second electrically conductive element 92 extending along at least a portion thereof in spaced relation from the first electrically conductive element 91 coupled at an end thereof to the first electrically conductive element.

Those of skill in the art will recognize that the embodiments and variations described herein may be used individually or in combination with one another. In addition, many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A wind turbine electrical generator comprising:
a monopole tower extending upwardly from ground level;
an electrical power generator carried by an upper end of said monopole tower and comprising a horizontally extending drive shaft; and
a plurality of wind-driven blades carried by said horizontally extending drive shaft;
said monopole tower having an outer surface with a vertically extending outer corner therein defining a pair of adjacent vertical facets, said monopole tower positioned with the vertically extending outer corner aligned with a land-based radar site so the pair of adjacent vertical facets reflects radar illumination away from the land-based radar site to reduce an amount of the radar illumination reflected back to the land-based radar site.

2. The wind turbine electrical generator according to claim 1, further comprising a housing carried by the upper end of said monopole tower and surrounding said electrical power generator; wherein said housing has an outer surface with an outer corner therein defining a pair of adjacent housing facets; and wherein said housing is positioned with the outer corner aligned with the land-based radar site so the pair of adjacent housing facets reflects radar illumination away from the radar site to reduce the amount of the radar illumination reflected back to the land-based radar site.

3. The wind turbine electrical generator according to claim 2, wherein said housing is positioned with the outer corner aligned with the land-based radar site so that neither of the pair of adjacent housing facets is less than 5 degrees from normal to the land-based radar site.

4. The wind turbine electrical generator according to claim 1, further comprising a hub cover coupled to said drive shaft; wherein said hub cover has an outer surface with an outer corner defining a pair of adjacent cover facets; and wherein said hub cover is positioned with the outer corner aligned with the land-based radar site so that the pair of adjacent cover facets reflects radar illumination away from the land-based radar site to reduce the amount of radar illumination reflected back to the land-based radar site.

5. The wind turbine electrical generator according to claim 1, wherein said monopole tower is positioned with the vertically extending outer corner aligned with the land-based radar site so that neither of the pair of adjacent vertical facets is less than 5 degrees from normal to the land-based radar site.

6. A wind turbine electrical generator comprising:
a monopole tower extending upwardly from ground level;
an electrical power generator carried by an upper end of said monopole tower and comprising a horizontally extending drive shaft;
a housing carried by the upper end of said monopole tower and surrounding said electrical power generator; and
a plurality of wind-driven blades carried by said horizontally extending drive shaft;
said monopole tower having a continuous outer surface with a vertically extending outer corner therein defining a pair of adjacent vertical facets, said monopole tower positioned with the vertically extending outer corner aligned with a land-based radar site so that the pair of adjacent vertical facets reflects radar illumination away from the land-based radar site to reduce an amount of radar illumination reflected back to the land-based radar site;
said housing having an outer surface with an outer corner therein defining a pair of adjacent housing facets, said housing positioned with the outer corner aligned with the land-based radar site so that the pair of adjacent housing facets reflects radar illumination away from the land-based radar site to reduce the amount of radar illumination reflected back to the land-based radar site.

7. The wind turbine electrical generator according to claim 6, wherein said monopole tower is positioned with the vertically extending outer corner aligned with the land-based radar site so that neither of the pair of adjacent vertical facets is less than 5 degrees from normal to the land-based radar site.

8. The wind turbine electrical generator according to claim 6, further comprising a hub cover coupled to said drive shaft; wherein said hub cover has an outer surface with an outer corner defining a pair of adjacent cover facets; and wherein said hub cover is positioned with the outer corner aligned with the land-based radar site so that the pair of adjacent cover facets reflects radar illumination away from the land-based radar site to reduce the amount of the radar illumination reflected back to the land-based radar site.

9. A method of positioning a wind turbine electrical generator, the wind turbine comprising a monopole tower extending upwardly from ground level, an electrical power generator carried by an upper end of the monopole tower and comprising a horizontally extending drive shaft, and a plurality of wind-driven blades carried by the horizontally extending drive shaft, the method comprising:
positioning the monopole tower having an outer surface with a vertically extending outer corner defining a pair of adjacent vertical facets aligned relative to a land-based radar site so that the pair of adjacent vertical facets reflects radar illumination away from the land-based radar site to reduce an amount of the radar illumination reflected back to the land-based radar site.

10. The method according to claim 9, further comprising positioning a housing having an outer surface with an outer corner defining a pair of adjacent housing facets aligned relative to the land-based radar site so that the pair of adjacent housing facets reflects radar illumination away from the land-based radar site to reduce the amount of radar illumination reflected back to the land-based radar site; and wherein the housing is positioned to surround the electrical power generator.

11. The method according to claim 9, further comprising positioning a hub cover to cover the drive shaft so that a hub cover outer surface with an outer corner defining a pair of adjacent cover facets is aligned with the land-based radar site so that the pair of adjacent cover facets reflects radar illumination away from the land-based radar site to reduce the amount of radar illumination reflected back to the land-based radar site.

12. The method according to claim 9, wherein positioning the monopole tower comprises positioning the monopole tower with the vertically extending outer corner aligned with the land-based radar site so that neither of the pair of adjacent vertical facets is less than 5 degrees from normal to the land-based radar site.

13. A wind turbine electrical generator comprising:
a tower extending upwardly from ground level;
an electrical power generator carried by an upper end of said tower and comprising a horizontally extending drive shaft; and
a plurality of wind-driven composite blades carried by said horizontally extending drive shaft;
each of said plurality of wind-driven composite blades comprising a dielectric material and a magnetic material therein having respective properties and in relative proportions so that said composite blade has a relative permittivity and a relative permeability within ±10 percent of each other at a predetermined radar frequency.

14. The wind turbine electrical generator according to claim 13, wherein said magnetic material comprises magnetic particles distributed within said dielectric material.

15. The wind turbine electrical generator according to claim 13, wherein said magnetic material comprises at least one of iron powder and nickel zinc powder.

16. The wind turbine electrical generator according to claim 15, wherein said iron powder comprises carbonyl iron powder.

17. The wind turbine electrical generator according to claim 15, wherein said iron powder comprises an insulation coated iron powder.

18. The wind turbine electrical generator according to claim 15, wherein each particle of said iron powder has a diameter less than or equal to a skin depth at the predetermined radar frequency.

19. The wind turbine electrical generator according to claim 15, wherein said nickel zinc powder comprises nickel zinc spinel powder.

20. The wind turbine electrical generator according to claim 13, wherein said dielectric material comprises fiberglass.

21. The wind turbine electrical generator according to claim 13, wherein said dielectric material comprises carbon fiber.

22. The wind turbine electrical generator according to claim 15, wherein said iron powder is uniformly distributed within said dielectric material.

23. A method of making a wind turbine electrical generator comprising a tower extending upwardly from ground level, an electrical power generator carried by an upper end of the tower and comprising a horizontally extending drive shaft, and a plurality of wind-driven composite blades carried by the horizontally extending drive shaft, the method comprising:
   forming each of the plurality of wind-driven composite blades from a dielectric material and a magnetic material having respective properties and in relative proportions so that the wind-driven composite blade has a relative permittivity and a relative permeability within ±10 percent of each other at a predetermined radar frequency.

24. The method according to claim 23, wherein the magnetic material comprises magnetic particles distributed within the dielectric material.

25. The method according to claim 23, wherein the magnetic material comprises iron powder.

26. A wind turbine electrical generator comprising:
   a tower extending upwardly from ground level;
   an electrical power generator carried by an upper end of said tower and comprising a horizontally extending drive shaft; and
   a plurality of wind-driven dielectric blades carried by said horizontally extending drive shaft;
   each of said plurality of wind-driven dielectric blades comprising a dielectric matrix and a plurality of hollow glass bubbles therein having respective properties and in relative proportions so that said wind-driven dielectric blade has a relative permittivity within ±10 percent of the relative permittivity of air.

27. The wind turbine electrical generator according to claim 26, wherein each of said plurality of hollow glass bubbles has a density in a range of between 0.10 and 0.13 grams per cubic centimeter.

28. The wind turbine electrical generator according to claim 26, wherein each of said plurality of hollow glass bubbles has a crush strength of at least 200 pounds per square inch.

29. The wind turbine electrical generator according to claim 26, wherein said plurality of hollow glass bubbles comprise soda-lime-borosilicate hollow glass bubbles.

30. The wind turbine electrical generator according to claim 26, wherein said plurality of hollow glass bubbles is uniformly distributed within said dielectric matrix.

31. The wind turbine electrical generator according to claim 26, wherein said dielectric matrix comprises at least one of fiberglass, carbon fiber, and resin.

32. A method of making a wind turbine electrical generator comprising a tower extending upwardly from ground level, an electrical power generator carried by an upper end of the tower and comprising a horizontally extending drive shaft, and a plurality of wind-driven dielectric blades carried by the horizontally extending drive shaft, the method comprising:
   forming each of the plurality of wind-driven dielectric blades from a dielectric matrix and a plurality of hollow glass bubbles having respective properties and in relative proportions so that the dielectric blade has a relative permittivity within ±10 percent of air.

33. The method according to claim 32 wherein each of the plurality of hollow glass bubbles has a density in a range between 0.10 and 0.13 grams per cubic centimeter.

34. The method according to claim 32 wherein each of the plurality of hollow glass bubbles has a crush strength of at least 200 pounds per square inch.

35. The method according to claim 32, wherein the plurality of hollow glass bubbles comprises soda-lime-borosilicate hollow glass bubbles.

36. The method according to claim 32, comprising distributing the plurality of hollow glass bubbles uniformly within the dielectric matrix.

37. A wind turbine electrical generator comprising:
   a tower extending upwardly from ground level;
   an electrical power generator carried by an upper end of said tower and comprising a horizontally extending drive shaft; and
   a plurality of wind-driven blades carried by said drive shaft, each comprising
      a first electrically conductive element extending the length of the wind-driven blade, and
      a second electrically conductive element extending along at least a portion of the wind-driven blade in spaced relation from said first electrically conductive element and having an end coupled to said first electrically conductive element,
      said second electrically conductive element having a length and a coupling location with said first electrically conductive element so that said first and second electrically conductive elements cooperate to change an electromagnetic resonance relative to a preselected transmission frequency.

38. The wind turbine electrical generator according to claim 37, wherein said first and second electrically conductive elements are carried by a surface of the wind-driven blade.

39. The wind turbine electrical generator according to claim 37, said first and second electrically conductive elements are embedded in the wind-driven blade.

40. The wind turbine electrical generator according to claim 37, wherein said second electrically conductive element has a shorter length than said first electrically conductive element.

41. The wind turbine electrical generator according to claim 37, wherein each of said plurality of wind-driven blades comprises electrically conductive material.

42. The wind turbine electrical generator according to claim 37, wherein said second electrically conductive element has an L-shape.

43. A method of making a wind turbine electrical generator comprising a tower extending upwardly from ground level, an electrical power generator carried by an upper end of the tower and comprising a horizontally extending drive shaft, and a plurality of wind-driven blades carried by the drive shaft, the method comprising:
   forming each wind-driven blade to include a first electrically conductive element extending the length thereof; and
   forming each wind-driven blade to include a second electrically conductive element extending along at least a portion thereof in spaced relation from the first electrically conductive element coupled at an end thereof to the first electrically conductive element;
   the second electrically conductive element having a length and a coupling location with the first electrically conductive element so that the first and second electrically conductive elements cooperate to change an electromagnetic resonance relative to a predetermined transmission frequency.

44. The method according to claim 43, comprising forming the second electrically conductive element to have a shorter length than the first electrically conductive element.

45. The method according to claim 43, comprising forming the plurality of wind-driven blades of an electrically conductive material.

46. The method according to claim 43, comprising forming the second electrically conductive element in an L-shape.

* * * * *